(12) United States Patent
Grabner et al.

(10) Patent No.: US 11,189,993 B2
(45) Date of Patent: Nov. 30, 2021

(54) SPARK PLUG AND METHOD FOR MANUFACTURING A SPARK PLUG

(71) Applicant: Innio Jenbacher GmbH & Co OG, Jenbach (AT)

(72) Inventors: Roland Grabner, Styria (AT); Johann Klausner, Tyrol (AT); Manfred Langsenlehner, Styria (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 17/047,652

(22) PCT Filed: Dec. 21, 2018

(86) PCT No.: PCT/AT2018/060316
§ 371 (c)(1),
(2) Date: Oct. 14, 2020

(87) PCT Pub. No.: WO2020/124103
PCT Pub. Date: Jun. 25, 2020

(65) Prior Publication Data
US 2021/0151959 A1    May 20, 2021

(51) Int. Cl.
*H01T 13/39*     (2006.01)
*B23K 26/354*    (2014.01)
*B23K 26/24*     (2014.01)
*H01T 21/02*     (2006.01)

(52) U.S. Cl.
CPC .............. *H01T 13/39* (2013.01); *B23K 26/24* (2013.01); *B23K 26/354* (2015.10); *H01T 21/02* (2013.01)

(58) Field of Classification Search
None
See application file for complete search history.

(56) References Cited

U.S. PATENT DOCUMENTS 8,715,025 B2 * 5/2014 Boehler .................. H01T 21/02
445/7

* cited by examiner

*Primary Examiner* — Vip Patel
(74) *Attorney, Agent, or Firm* — Fletcher Yoder, P.C.

(57) ABSTRACT

Method for manufacturing a spark plug for a combustion engine, wherein the spark plug has at least two components which are joined by at least one welded joint which has been manufactured in a welding process, wherein for improving selected material properties of the welded joint a laser beam is directed to the welded joint and in that a powder which improves the selected material properties is introduced into the welded joint which is melted on its surface by the laser beam such that the powder melts and due to a connection of the melted powder with the melted aggregate structure of the surface of the welded joint a treated area with improved material properties results.

20 Claims, 10 Drawing Sheets

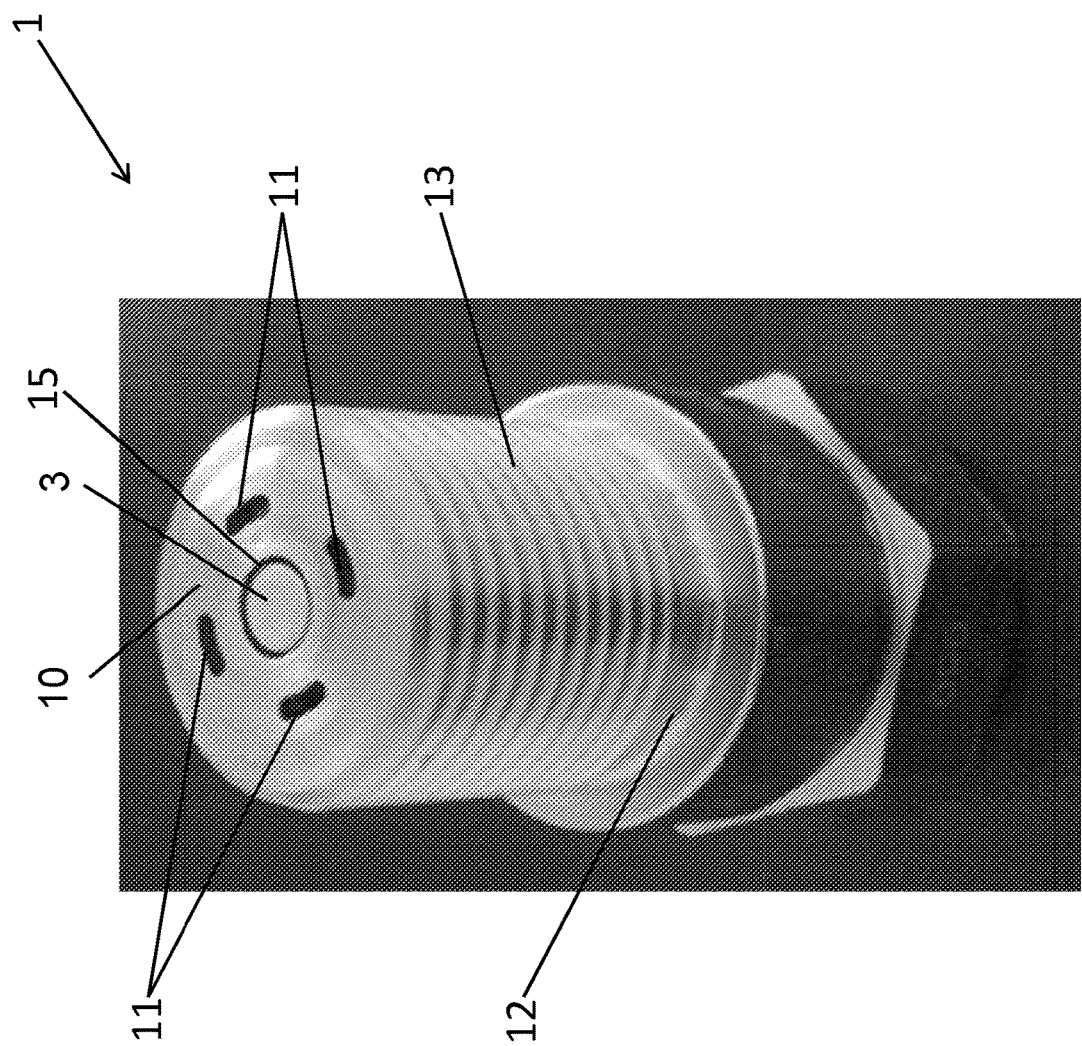

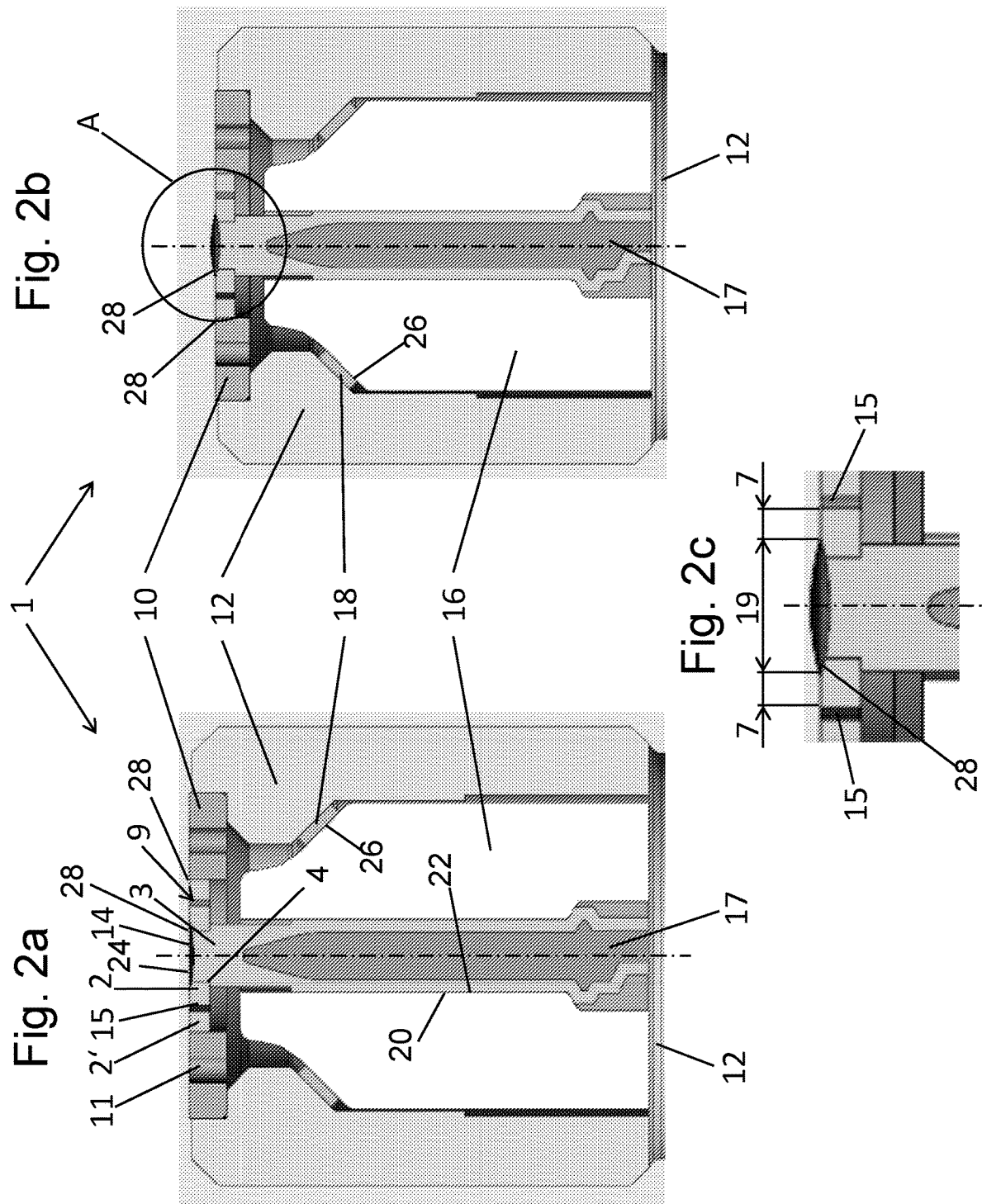

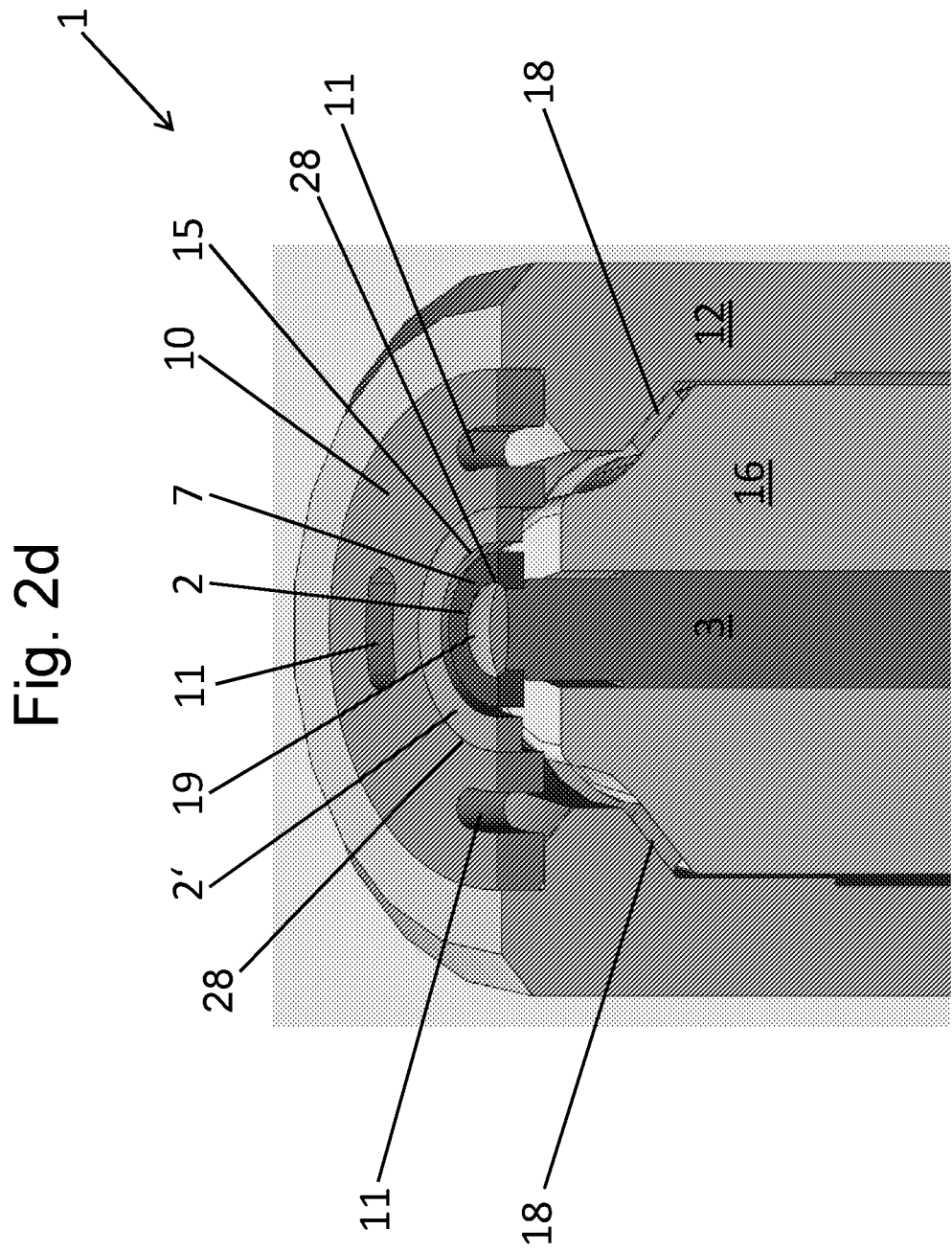

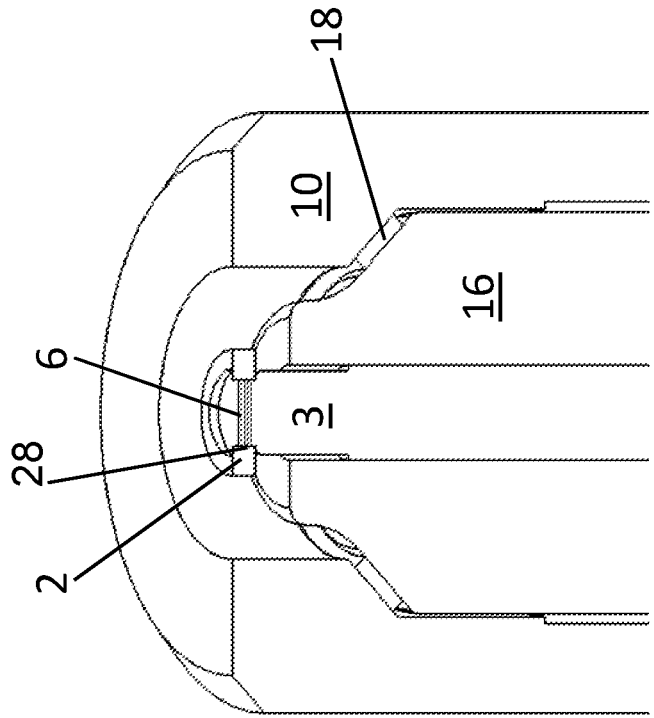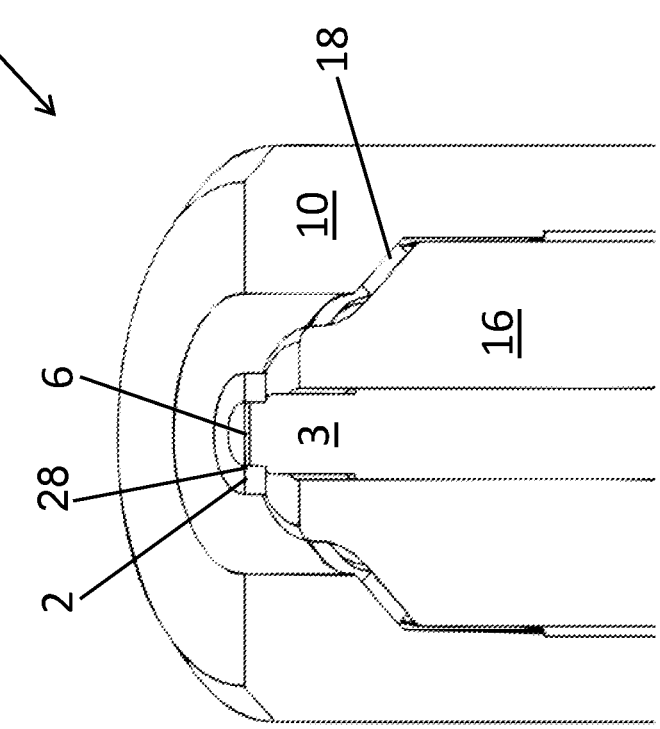

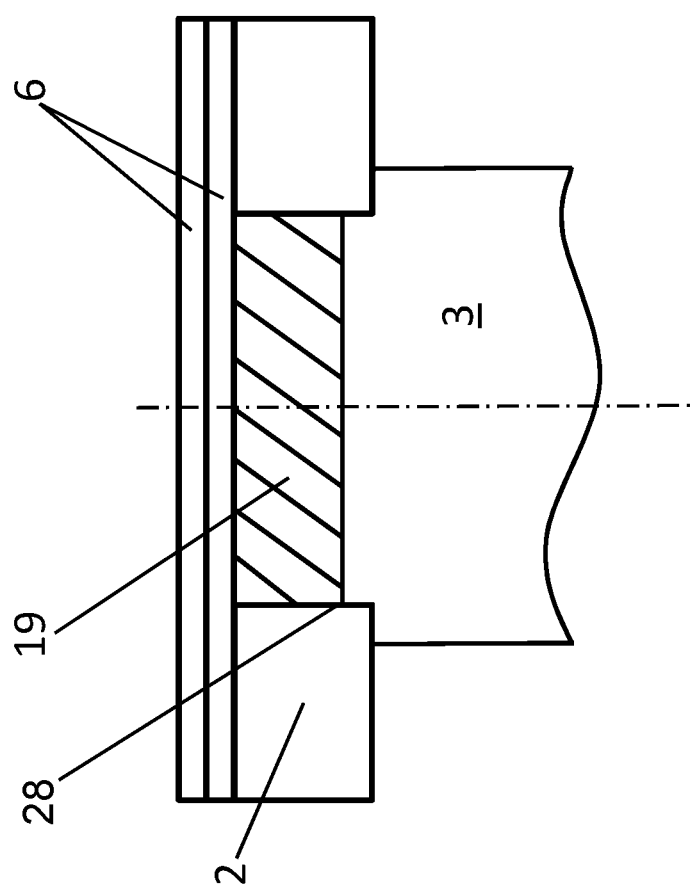

SPARK PLUG AND METHOD FOR MANUFACTURING A SPARK PLUG

CROSS-REFERENCE TO RELATED APPLICATIONS

This application claims benefit of and is a National Stage entry from PCT Application No. PCT/AT2018/060316, filed on Dec. 21, 2018; entitled "Spark Plug and Method for Manufacturing a Spark Plug", which is herein incorporated by reference in its entirety.

BACKGROUND

The invention concerns a method for manufacturing a spark plug for a combustion engine, and a spark plug for a combustion engine.

Generic spark plugs have a middle electrode, which referring to a longitudinal axis of the spark plug, is arranged centrally, and at least one mass electrode radially distanced from said middle electrode. An ignition gap is formed between abutting areas (ignition areas) of the middle electrode and the at least one mass electrode.

It is known to form the middle electrode and/or the at least one mass electrode in at least two parts, wherein the ignition areas are each formed by a body of precious metal arranged on a mass electrode carrier and a middle electrode carrier, respectively. The respective body of precious metal is connected by a welded joint to the mass electrode carrier and the middle electrode carrier, respectively. Such a spark plug is disclosed, e.g., by EP 0 859 436 A1 or EP 3 068 001 A1.

Generic spark plugs are manufactured, e.g., by a laser welding process.

Spark plugs are exposed to high temperatures and mechanical pressures during operation of the combustion engine, which over time leads to removal of electrode material in the ignition gap of the spark plug and, therefore, to a reduction in lifetime. Another disadvantage of spark plugs known from the prior art are changes in the region of the face side and face area, respectively, of the spark plug pin and the body of precious metal, which face the combustion chamber (in direction of ignition) which are caused by hot corrosion or oxidation.

In the prior art, it was tried to arrange the spark plug as far as possible outside the combustion chamber which, however, entails the disadvantage that a spark position of the spark plug is not arranged as far in the combustion chamber as would be necessary for an adequate ignition of fuel.

A further strategy of the prior art consists in dissipating into the cylinder head (often using a spark plug sleeve) as quickly and fully as possible the amount of heat which is introduced into the components of the spark plug. To this end, middle electrode carriers often have a core of material with good conductivity such as, e.g., copper. It is a problem, however, that the area of the contact region between an insulating body (often manufactured from ceramic) bearing the middle electrode carrier and the spark plug housing is very small, so that in the face region of the middle electrode carrier heat is not dissipated sufficiently to avoid said problems.

BRIEF DESCRIPTION

It is an object of the invention to provide a generic method for manufacturing a spark plug for a combustion engine and a spark plug for a combustion engine, having an increased lifetime, preferably by minimizing hot corrosion and/or oxidation.

This object is accomplished by a method for producing a spark plug for a combustion engine with the features of claim 1 and a spark plug for a combustion engine with the features of claim 13.

Because a method according to the invention provides that to improve selected material properties of the welded joint (which preferably is manufactured by way of laser welding)—and possibly of an area abutting the welded joint—a laser beam is directed to the welded joint—and possibly to the area abutting the welded joint—and that a powder improving the selected material properties is introduced into the welded joint the surface of which has been melted by the laser beam—and possibly into the area abutting the welded joint—such that the powder melts and a treated (alloy) region with improved material properties results by connecting the melted powder with the melted aggregate area of the surface of the welded joint—and possibly of the area abutting the welded joint—the welding seam of the welded joint which during operation of the combustion engine protrudes into the combustion chamber is protected by the treated area because the treated area prevents hot corrosion in the area of the welding seam—and possibly of the region abutting the welding seam—and oxidation behavior of the treated area is more favorable than oxidation behavior of the untreated welding seam.

With respect to the spark plug according to the invention (which is preferably manufactured by the method according to the invention), it is provided that in the area of the welded joint (which is preferably manufactured by laser welding)—and possibly of an area abutting the welded joint—an alloyed area is present which is manufactured by melting the welded joint—and possibly the area abutting the welded joint—and introducing a powder. The alloyed area protects the welded joint—and possibly the area abutting the welded joint—from hot corrosion. Oxidation behavior of the treated area is therefore more favorable than oxidation behavior of the untreated welded joint.

The welded joint can be presented in the form of a welded seam. Preferably, the welded seam is a fillet weld (in German "Kehlnaht").

Advantageous embodiments of the invention are defined in the appendant claims.

With respect to an embodiment of the inventive method, it is provided that parts of an electrode of the spark plug are used as the at least two components, which are joined by the at least one welded joint, preferably in the form of an electrode carrier and of a body of precious metal connected to the electrode carrier by way of the at least one welded joint.

With respect to an embodiment of the inventive method, it is provided that a middle electrode carrier, preferably in the form of a spark plug pin, is used as an electrode carrier. It is further preferably provided that, before manufacturing the at least one welded joint, the body of precious metal is connected to the middle electrode carrier to form a step.

Furthermore, it can be preferably provided that the step is worked into an end area or an area of the face side, respectively, of the middle electrode carrier and/or the body of precious metal is arranged onto the middle electrode carrier to form a step, said latter step being formed essentially because the attached body of precious metal projects over the face side of the middle electrode carrier forming a (substantially concave) indentation.

Furthermore, it can be preferably provided that the powder is introduced into the indentation and preferably in such an amount that the (concave) indentation is filled up or is covered by melted and resolidified powder.

It can be advantageous if it is provided that a possibly protruding area of melted and resolidified powder is removed by removal of material (e.g., by milling, turning or grinding). It can be provided that the surface is smoothed after removal of material.

With respect to an embodiment of the method according to the invention, it is provided that at least the treated area and preferably another, untreated area (which is preferably formed by an area immediately adjacent to an ignition area of the electrode—wherein the area is arranged perpendicular to the ignition area) immediately adjacent to the treated area is coated with a cover layer or several stacked cover layers which preferably consist of different materials and/or at least one such cover layer is arranged underneath the treated area.

With respect to an embodiment of the inventive method, it is provided that an area immediately adjacent to the treated area is left untreated, which area left untreated preferably is present in the form of an area which is adjacent to an ignition area of the electrode (which area is arranged perpendicular to the ignition area). In this way, a negative influence of the alloying on the lifetime of the electrode, preferably of the middle electrode, can be prevented.

With respect to an embodiment of the inventive method, it is provided that the laser beam is directed onto the welded joint and possibly the area surrounding the welded joint with a convergent or divergent (generally: defocused) beam zone. The focus of the laser beam is then positioned above or below the welded joint during alloying.

With respect to an embodiment of the inventive method, it is provided that an increase of resistance against hot corrosion and/or against oxidation is selected as improved material property and a metal powder which is resistant against hot corrosion and/or oxidation is used as a powder, possibly with different material components, wherein it is preferably provided that a corrosion-resistant Nickel powder or a metal powder including a ceramic material is used as the powder. Further or alternative material properties could be, e.g., increased temperature resistance and/or higher thermal conductivity.

With respect to an embodiment of the inventive method, it is provided that a corrosion-resistant Nickel powder (e.g., available under the trade names Inconel 600 or Inconel 625) or a metal powder including a ceramic material is used as a powder.

With respect to an embodiment of the inventive method, it is provided that the powder is introduced, preferably blown, into the laser beam distanced from the welded joint, and possibly distanced from a zone surrounding the weld joint.

With respect to an embodiment of the inventive method, it is provided that the method is carried out in a protective atmosphere (e.g., Argon).

With respect to an embodiment of the inventive spark plug, it is provided that the components joined by the at least one welded joint are parts of an electrode of the spark plug, preferably in the form of an electrode carrier, particularly preferred of a middle electrode carrier, and of a body of precious metal connected to the electrode carrier by the at least one welded joint. With respect to the present disclosure, a body of precious metal is a body which either consists of precious metal (preferably an alloy with precious metal) or is coated with precious metal.

It is in this case preferably provided that an area immediately adjacent to the alloyed area is left untreated, which area left untreated preferably is present in the form of an area which is adjacent to an ignition area of the electrode (which area is arranged perpendicular to the ignition area). In this way, a negative influence of the alloying on the lifetime of the electrode, preferably of the middle electrode, can be prevented.

The ignition area or the two ignition areas, respectively, form the ignition gap. It is preferred to leave that area untreated which is immediately adjacent to the ignition area of the middle electrode and is arranged substantially perpendicular to the ignition area of the middle electrode.

It can be provided that the body of precious metal is connected to the middle electrode carrier forming a step. In this case, it can be preferably provided that the step is worked into an end area of the middle electrode carrier and/or the body of precious metal is put onto the middle electrode carrier to form a step.

It can be provided that an indentation is present into which the powder is introduced in such an amount that the indentation is filled up or is covered by melted and resolidified powder.

In this case, it can be advantageous that an area of—possibly protruding—melted and resolidified powder is removed by removal of material such that the body of precious metal has a stepless surface arranged perpendicular to the ignition area.

With respect to an embodiment of the inventive spark plug, it is preferably provided that a corrosion-resistant Nickel powder (e.g., available under the trade names Inconel 600 or Inconel 625) or a metal powder including a ceramic material is used as a powder.

With respect to an embodiment of the inventive spark plug it is provided that at least the treated area and preferably another, untreated area (which is preferably formed by an area adjacent to an ignition area of the electrode—wherein the area is arranged perpendicular to the ignition area) immediately adjacent to the treated area is coated with a cover layer or several stacked cover layers which preferably consist of different materials and/or at least one such cover layer is arranged underneath the treated area. Alternatively or additionally such a cover layer can be provided below the treated area (of course, in this case the cover layer(s) is or are applied before manufacturing the treated area).

With respect to an embodiment of the inventive spark plug said spark plug has a mass electrode in the shape of a ring, preferably of a disk-shaped circular ring (a so-called ring electrode) wherein an ignition area is formed by an inner sleeve surface of the ring. The mass electrode can be provided with at least one, preferably a plurality of through opening(s) on that surface which is arranged perpendicular to the ignition area. By way of these through opening(s) a fuel-air-mixture can enter the spark plug during operation.

With respect to an embodiment of the inventive spark plug it can be provided that the alloyed region shows improved resistance against hot corrosion and/or against oxidation. Improved temperature resistance and/or increased thermal conductivity can be further or alternative properties.

It is preferred that the mass electrode is formed by a mass electrode carrier (which can be connected to the spark plug housing—preferably by a welded joint) and a body of precious metal which is connected to the mass electrode carrier (preferably by a welded joint). If such a mass electrode is provided with the features of the preceding paragraph the explanations made with respect to the ring are also applicable with respect to the body of precious metal of the mass electrode. The body of precious metal can be arranged on a step or a face area of the mass electrode carrier and can be connected to the mass electrode carrier.

Mass electrode and middle electrode can be formed as a spherical ring or a circle, respectively, when viewed from above. However, they could also be provided with a polygonal peripheral rim.

The inventive method can be used, alternatively or additionally, with respect to a mass electrode and preferably with respect to a welded joint between a mass electrode carrier and a body of precious metal connected with said welded joint. This is also applicable with respect to the described embodiments and with respect to the inventive spark plug and the described embodiments of the spark plug.

It is to be mentioned that the invention is not limited to spark plugs with mass electrodes formed as ring electrodes but can also be used with respect to spark plugs having mass electrodes of arbitrary design, e.g., in the form of at least one hook electrode.

BRIEF DESCRIPTION OF THE DRAWINGS

Embodiments of the invention are discussed with respect to the figures, wherein the figures show:

FIG. 1 is a perspective view of a spark plug manufactured in accordance with the invention;

FIGS. 2a-d are schematic sectional views through a spark plug according to FIG. 1 before and after alloying, respectively, and an isometric sectional view;

FIGS. 7a-e are perspective views of a spark plug, illustrating steps of the inventive method;

FIG. 8 is a sectional view of another embodiment of the invention.

DETAILED DESCRIPTION

Figure 3:
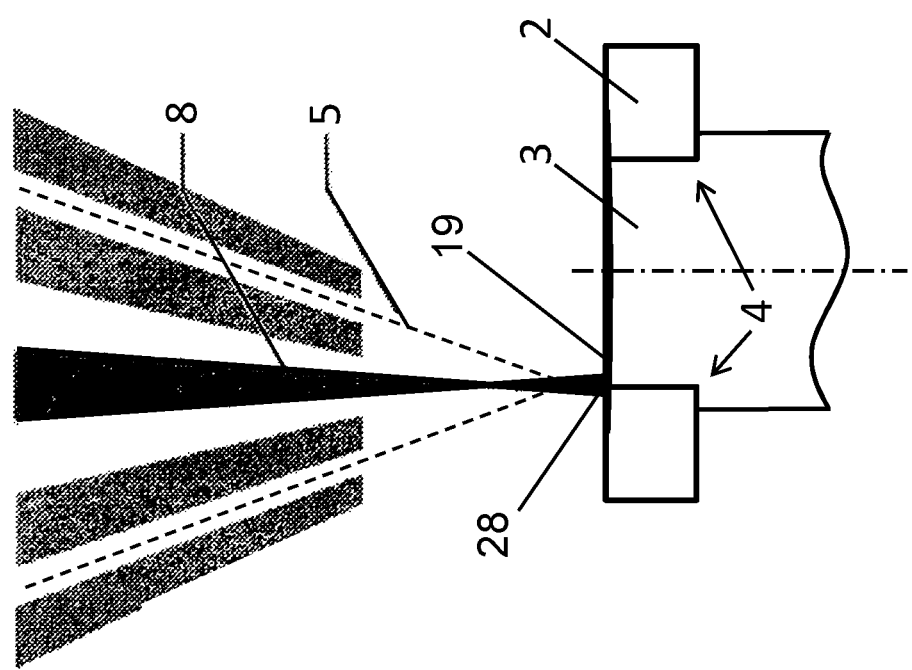
FIG. 3 is a schematic view of a spark plug and a laser beam, illustrating applying and, simultaneously, melting of powder.

FIG. 1 shows a photo of a spark plug 1 manufactured according to the inventive method.

The spark plug 1 has a spark plug housing 12, which is provided with a thread 13 in an area facing ignition. A ring-shaped ignition gap 15 is formed between a middle electrode (middle electrode carrier 3) and a mass electrode (mass electrode carrier 10), which is in the form of a ring electrode. By way of example, here the mass electrode is provided with four openings 11, which allow passage of combustion gases during operation of the spark plug 1 in a combustion engine.

The structure of the spark plug 1 shown in FIG. 1 can be seen in FIG. 2a-d, wherein FIG. 2a shows an intermediate product of the inventive method:

As is known in the art, the spark plug 1 comprises a ceramic body 16 arranged within the spark plug housing 12 (the thread 13 is not shown), wherein a pin 20 is arranged within a central opening 22, and the pin 20 forms an electrode carrier of the middle electrode (middle electrode carrier 3) with an end 24 (e.g., face side) facing ignition. As shown, the pin 20 can have a core 17 of material with good thermal conductivity (e.g., copper) to increase heat dissipation. Dissipation of heat into the spark plug housing 12 is affected by a seal 18, which is arranged between a shoulder 26 of the ceramic body 16 and the spark plug housing 12.

Figure 4B:
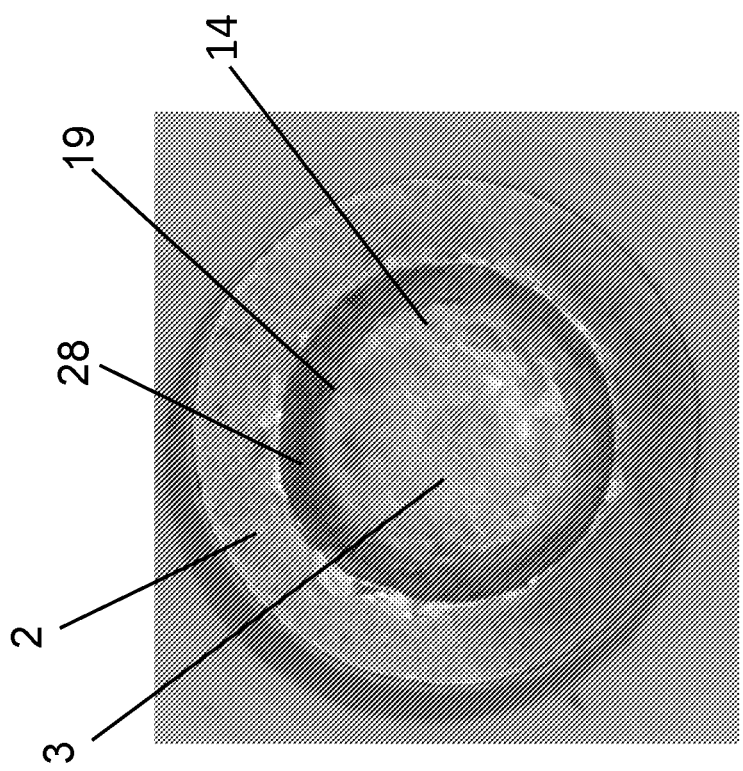
FIGS. 4a,b illustrate a sectional view of a spark plug according to FIG. 2a and a respective photo.

A body of precious metal 2 is joined, by a welded joint 28, onto the middle electrode carrier 3 (here by way of laser welding). In this embodiment, the body of precious metal 2 is formed as a circular-shaped disk and is put on a shoulder of a step 4 of the middle electrode carrier 3 (which is here formed as a spark plug pin). The welded joint 28 extends over step 4 completely. It is preferred that before welding, preferably laser welding, the body of precious metal 2 protrudes over the end 24 (e.g., face side) of the middle electrode carrier 3, which is arranged towards ignition to provide the welded joint 28 (e.g., a welded seam, preferably a fillet weld) at the transition from the body of precious metal 2 to the middle electrode carrier 3 (e.g., 2 and 3 being components of the spark plug 1). This results in an indentation 14, which is substantially concave in the respective region (FIGS. 2a and 4b), which is only partially filled or filled completely by the inventive manufacturing method (FIGS. 2b, 2c and 2d).

A mass electrode carrier 10 is connected to the spark plug housing 12. A body of precious metal 2' in the form of a ring is connected to the mass electrode carrier 10 (here by laser welding). The ignition areas 9 of the bodies of precious metal 2, 2', which face each other define the ignition gap 15.

The presentation of FIG. 2, which with respect to the inventive manufacturing process forms an intermediate step, corresponds to spark plugs 1 of the prior art. During operation of the spark plug 1 in a combustion engine, the welded joint 28 between the body of precious metal 2 and the middle electrode carrier 3 (and the welded joint 28 between body of precious metal 2' and mass electrode carrier 10) is exposed to the combustion gases without protection. In FIG. 2b, an alloyed area (e.g., treated area 19) can be seen in the area of the welded joint 28, which is manufactured by melting a surface of the welded joint 28 and introducing a powder 5. Said alloyed area does not only cover the welded joint 28 but, in this embodiment, extends into a region adjacent to the welded joint 28, i.e. in a radial view both, to larger radii (however an untreated area 7 remains adjacent to the ignition gap 15) and to smaller radii (here over the complete central region). Therefore, the middle electrode 3 depicted in FIGS. 2b and 2d has an untreated area 7 starting from the ignition gap 15 and extending radially inwards and an adjacent treated area 19 (cf. the detail view of FIG. 2c).

An alloyed area (e.g., treated area 19) for protection of the welded joint 28 could also be provided with respect to the welded joint 28 between mass electrode carrier 10 and the body of precious metal 2' of the mass electrode (e.g., 10 and 2' being components of the spark plug 1). In an alternative embodiment, the alloyed area could be provided only with respect to this welded joint 28 which, however, is not provided for in this embodiment.

In FIG. 3, manufacture of the alloyed area (e.g., treated area 19) is shown. According to the invention, this is done by directing a laser beam 8 onto the welded joint 28 and by introducing a powder 5, which improves the material properties into the surface, which has been melted by the laser beam 8 such that the powder 5 melts and a treated (alloyed) area 19 forms with improved material properties by connecting the melted powder 5 with the melted aggregate structure of the surface of the welded joint 28.

Figure 5B:
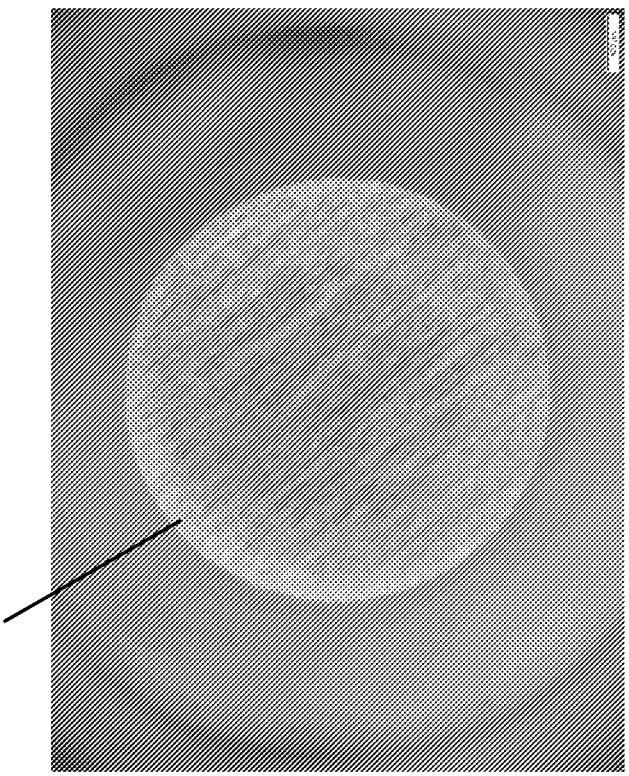
FIGS. 5a,b illustrate a sectional view of a spark plug and a photo after alloying and before a grinding process.
Figure 5A:
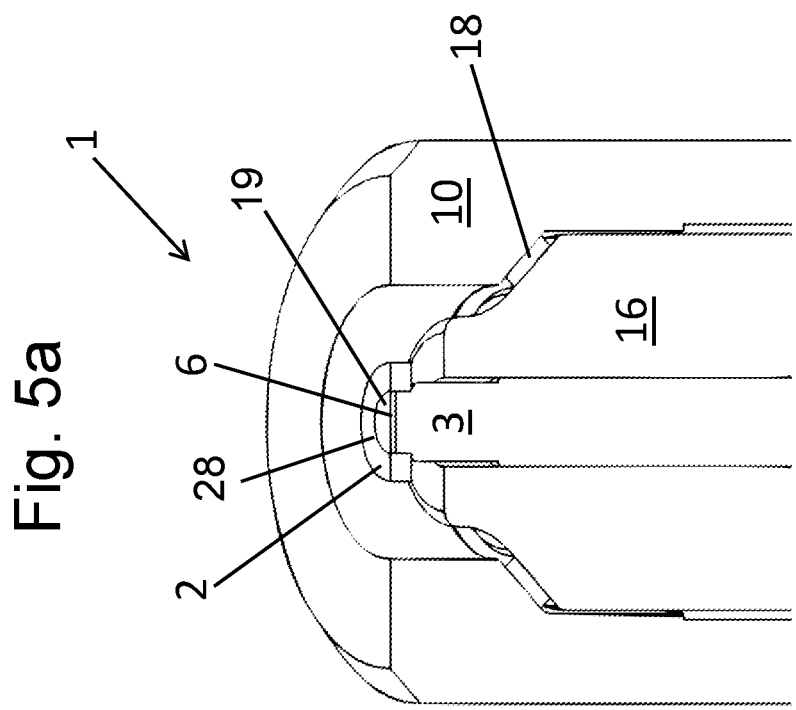

It can also be provided that the indentation 14 is filled by the inventive method. An excess of applied material in the treated area 19, which can be seen in FIG. 2c in particular, can be subsequently removed by turning, milling, grinding or the like, such that a plane area according to FIG. 5a and FIG. 5b is formed.

In FIG. 3, only that area of the middle electrode 3 is shown which faces ignition. It can be seen that the laser beam 8 is directed to the welded joint 28 with a defocused or "out of focus" illumination (i.e., a convergent or divergent) beam section (in FIG. 3 below the focus). Here, the powder 5 is introduced into the laser beam 8 in the divergent beam section above the surface of the welded joint 28.

An advantage of an "out of focus" illumination of the laser beam 8 is a more homogenous spread of the power density of the laser beam 8 over a larger area. It was found that a variable thermic introduction can be achieved using the same laser-setup by varying the distance between the focus and the area to be operated on. As only a single laser-setup is needed expenses can be saved.

Figure 4A:
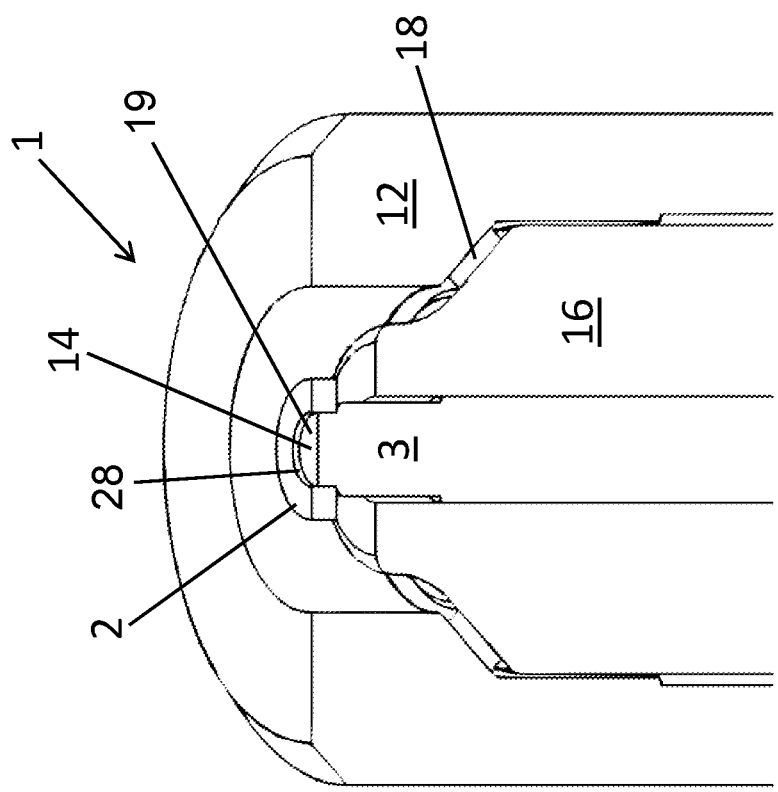

FIG. 4a shows a schematic sectional view in a way corresponding to FIG. 2a (wherein, however, the mass electrode 10 is not shown) of that area of the spark plug 1 which faces ignition. In a photo of a view from above (FIG. 4b) on the spark plug pin 20, a body of precious metal 2 can be seen after the laser welding process, which body has been arranged on the middle electrode carrier 3, preferably by pressing it onto the middle electrode carrier 3. The welded joint 28 is substantially formed by a fillet weld. It can also be seen that an indentation 14 is formed by the welding process.

FIG. 5a shows in a schematic sectional view that area of the spark plug 1, which faces ignition. A protrusion of powder 5 solidified by the laser beam 8 is removed by removal of material (here: grinding), such that in a direction facing ignition the untreated area 7 and the treated area 19 abut flush.

Figure 6A:
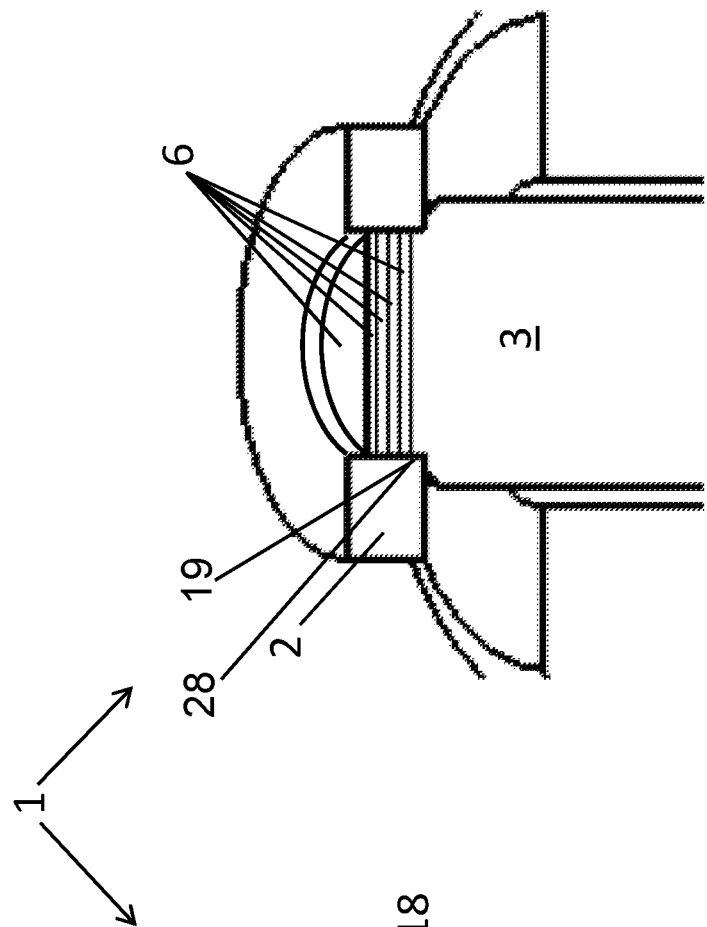
FIGS. 6a,b illustrate a sectional view of a spark plug and a detail view of another embodiment of the invention.
Figure 6B:
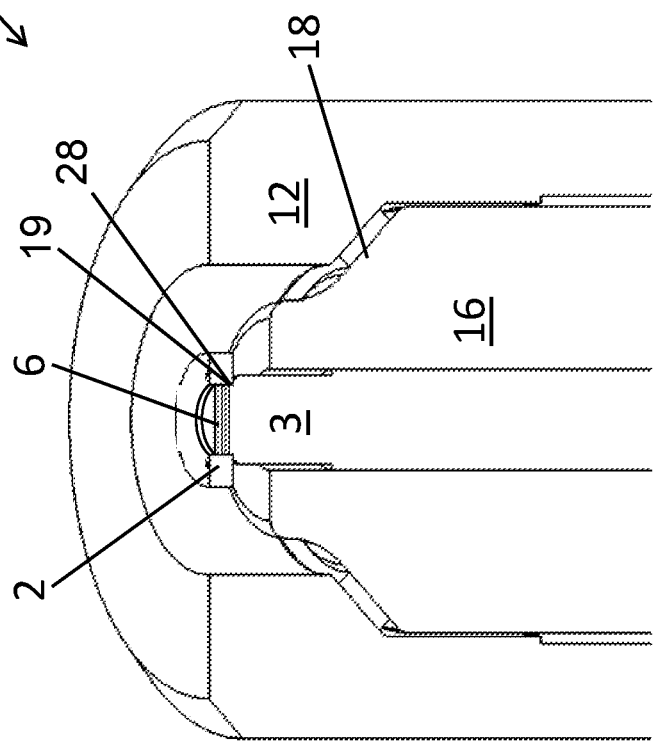

As shown in FIGS. 6a and 6b (detail of FIG. 6a), in another embodiment, it can be provided that at least the treated area 19 and preferably also another, untreated area 7, which is arranged immediately adjacent to the treated area 19, can be covered by several cover layers 6, which are stacked and which preferably consist of different materials. This covering (e.g., cover layers 6) can be done by any known technique.

In FIGS. 7a-e, the intermediate products of the inventive method are shown.

Figure 7B:
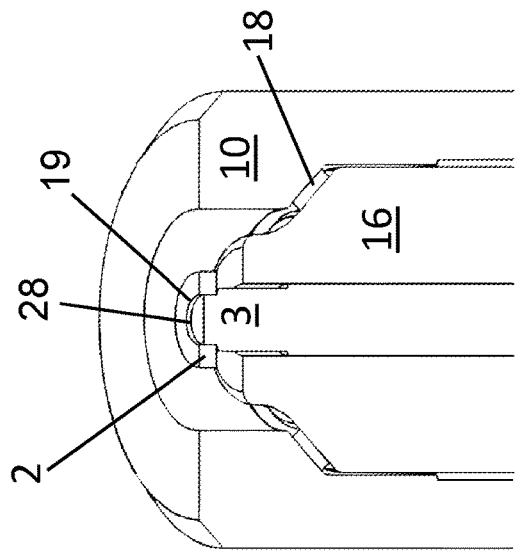
Figure 7A:
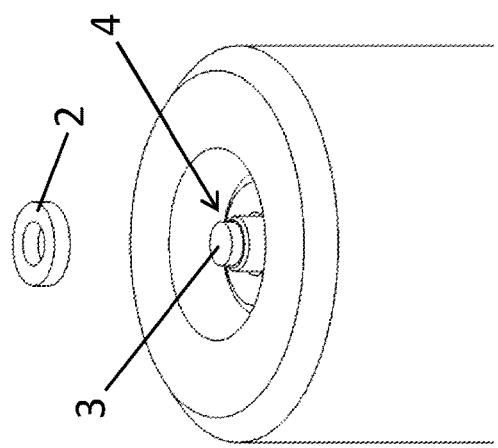
Figure 7C:
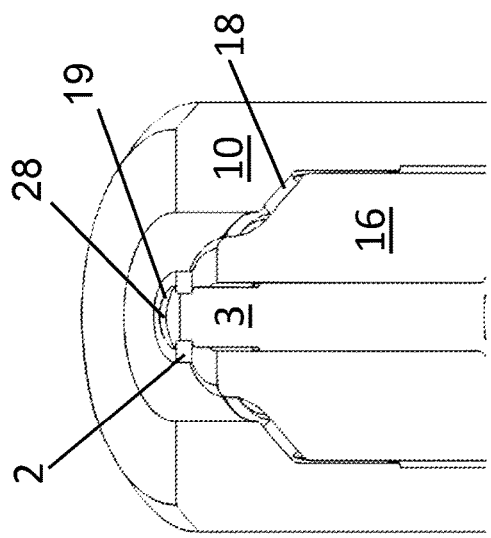

In FIG. 7a, the body of precious metal 2 is arranged onto a chamfered tip of the middle electrode carrier 3 and is welded to the middle electrode carrier 3 by laser welding, such that the state shown in FIG. 7b results. In the transition to FIG. 7c, the alloyed area (e.g., treated area 19) has been manufactured as described above. In the transition to FIG. 7d, a protrusion of powder 5 has been removed. In the variant according to FIG. 7e, several cover layers 6 have been arranged on top of each other on the alloyed area (e.g., treated area 19).

In the embodiment of FIG. 8, only the tip of the middle electrode carrier 3 including the body of precious metal 2 is shown. Here, by way of example, two cover layers 6 cover the body of precious metal 2 completely including the treated area 19 and extend to the ignition area 9. Other than shown, more than two cover layers 6 or a single cover layer 6 can be provided.

LIST OF REFERENCE SIGNS 1 spark plug
2, 2' body of precious metal
3 middle electrode carrier
4 step
5 powder
6 cover layer
7 untreated area
8 laser beam
9 ignition area
10 mass electrode carrier
11 openings in a body of precious metal of the mass electrode
12 spark plug housing
13 thread
14 indentation
15 spark gap
16 ceramic body
17 core
18 seal
19 treated area
20 pin
22 central opening
24 end
26 shoulder
28 welded joint

The invention claimed is:

1. A spark plug for a combustion engine, wherein the spark plug comprises:
   at least two components of the spark plug joined by a welded joint, wherein the welded joint comprises a first material; and
   a treated area at least at a surface of the welded joint, wherein the treated area comprises an alloy including the first material of the welded joint and a second material different from the first material, wherein the treated area protects the welded joint.

2. The spark plug according to claim 1, wherein the at least two components joined by the welded joint are parts of an electrode of the spark plug, wherein the parts of the electrode comprise an electrode carrier and a body of precious metal connected to the electrode carrier by the welded joint.

3. The spark plug according to claim 2, wherein the treated area excludes an untreated area immediately adjacent to the treated area, wherein the untreated area is arranged adjacent to an ignition surface of the electrode.

4. The spark plug according to claim 1, wherein the second material is resistant against at least one of hot corrosion or oxidation, wherein the second material comprises at least one of a Nickel based alloy or a ceramic.

5. The spark plug according to claim 1, wherein one or more cover layers are disposed at least one of under or over at least the treated area.

6. A method for manufacturing a spark plug for a combustion engine, comprising:
   directing a laser beam at a welded joint between at least two components of a spark plug;
   melting a surface of the welded joint with the laser beam to form a first melted material;
   melting a powder with the laser beam to form a second melted material; and
   connecting and solidifying the first and second melted materials to form a treated area at least along a surface of at the welded joint to protect the welded joint.

7. The method according to claim 6, wherein parts of an electrode of the spark plug are used as the at least two components.

8. The method according to claim 7, wherein the parts of the electrode comprise a middle electrode carrier and a body of precious metal.

9. The method according to claim 8, wherein the body of precious metal is connected to the middle electrode carrier to form a step.

10. The method according to claim 9, wherein the step is worked into an end area of the middle electrode carrier or the body of precious metal is arranged onto the middle electrode carrier while leaving behind the step.

11. The method according to claim 6, comprising at least partially filling an indentation with the second melted material of the powder to form a filled portion.

12. The method according to claim 11, comprising at least partially removing the filled portion after connecting and solidifying the first and second melted materials.

13. The method according to claim 6, wherein one or more cover layers are disposed at least one of under or over at least the treated area.

14. The method according to claim 6, wherein the treated area excludes an untreated area immediately adjacent to the treated area.

15. The method according to claim 6, wherein the laser beam is directed to the welded joint with an unfocused beam section.

16. The method according to claim 6, wherein the treated area has an increase of resistance against at least one of hot corrosion or oxidation, wherein the powder comprises a metal powder which is resistant against at least one of hot corrosion or oxidation, wherein the metal powder comprises at least one of a corrosion-resistant Nickel powder or a metal powder including a ceramic material.

17. The method according to claim 6, wherein the powder is introduced into the laser beam distanced from the welded joint.

18. A method, comprising:
    treating a surface of a welded joint between at least two components of a spark plug, wherein the treating comprises:
        melting the surface of the welded joint;
        melting a material onto the surface of the welded joint; and
        solidifying the material on the surface of the welded joint to form a treated area to protect the welded joint.

19. The method according to claim 18, wherein, relative to the welded joint, the material has a greater resistance against at least one of hot corrosion or oxidation.

20. The method according to claim 18, wherein the material comprises at least one of a Nickel based alloy or a ceramic.

* * * * *